United States Patent [19]
Mangelsen et al.

[11] Patent Number: 5,704,601
[45] Date of Patent: Jan. 6, 1998

[54] POSITIONING TABLE

[75] Inventors: J. Chris Mangelsen, Charlotte; Jens Mangelsen, Clinton, both of Iowa

[73] Assignee: Genesis Systems Group, Ltd., Davenport, Iowa

[21] Appl. No.: 596,688

[22] Filed: Feb. 1, 1996

[51] Int. Cl.⁶ .................................................. B23Q 1/04
[52] U.S. Cl. ........................ 269/57; 269/58; 269/74; 269/82; 269/329
[58] Field of Search ........................... 269/20, 25, 27, 269/30, 31, 55, 58, 71, 72, 73, 74, 289 R, 82, 309, 315, 320, 329; 116/230, 284, 296, 300

[56] References Cited

U.S. PATENT DOCUMENTS

| | | | |
|---|---|---|---|
| 2,469,644 | 5/1949 | Harrison | 269/309 |
| 3,017,176 | 1/1962 | Breed | 269/58 |
| 4,767,109 | 8/1988 | Raketich | 269/71 |
| 5,330,168 | 7/1994 | Enomoto et al. | 269/329 |

FOREIGN PATENT DOCUMENTS

| | | | |
|---|---|---|---|
| 707643 | 4/1965 | Canada | 269/71 |

*Primary Examiner*—Robert C. Watson
*Attorney, Agent, or Firm*—Zarley,McKee,Thomte,Voorhees, & Sease

[57] ABSTRACT

A reciprocating table assembly includes a frame, a table, and a bearing assembly for rotatably mounting the table to the frame. A cylinder assembly rotates the table at a pivot point by extending and retracting a piston rod from the cylinder. Three sensors sense which position the table is in its rotational path and signal the piston rod to either extend or contract at the appropriate time.

11 Claims, 4 Drawing Sheets

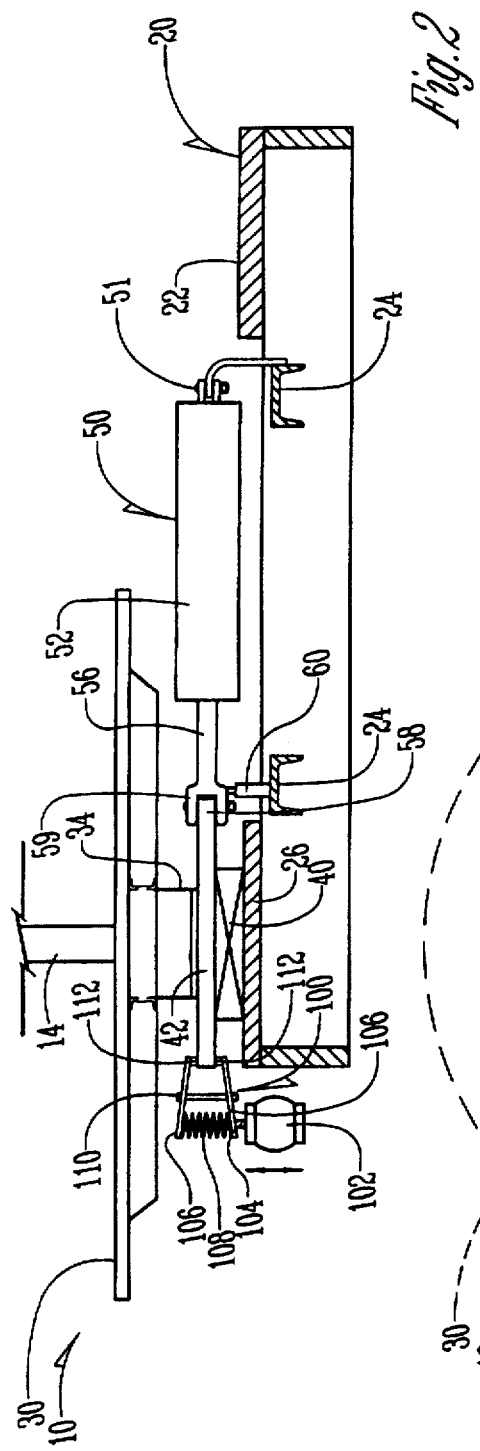
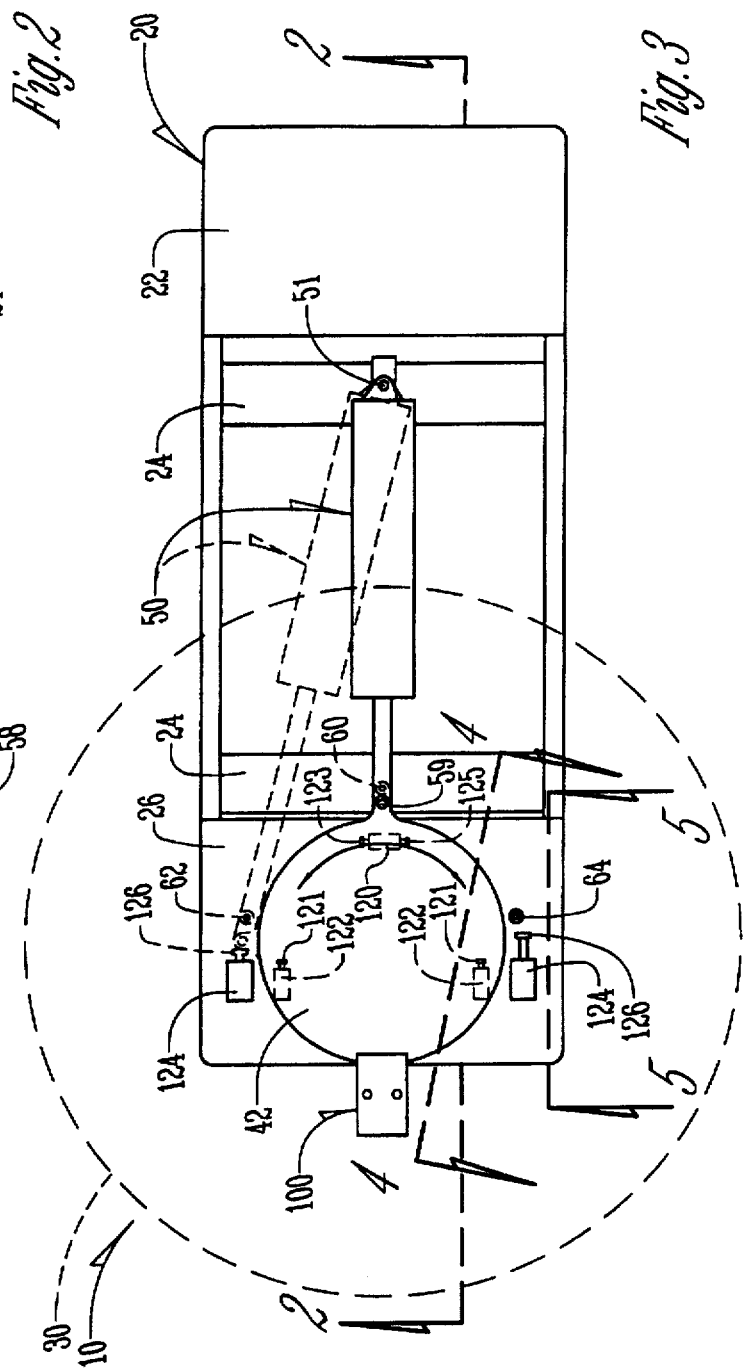

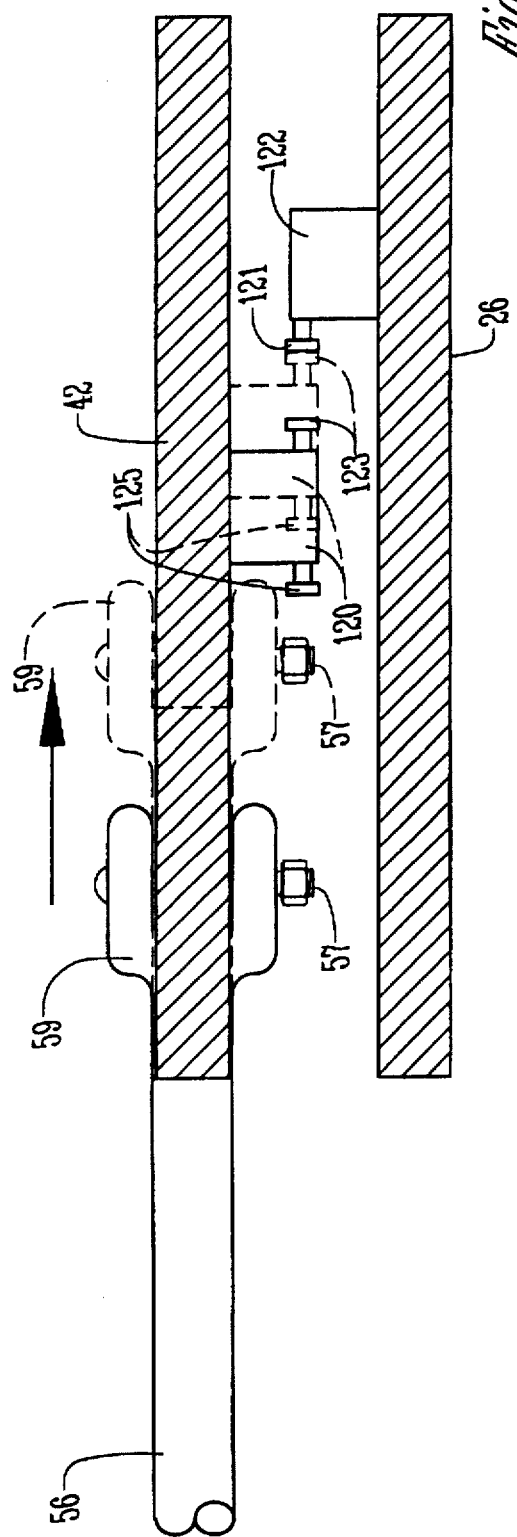
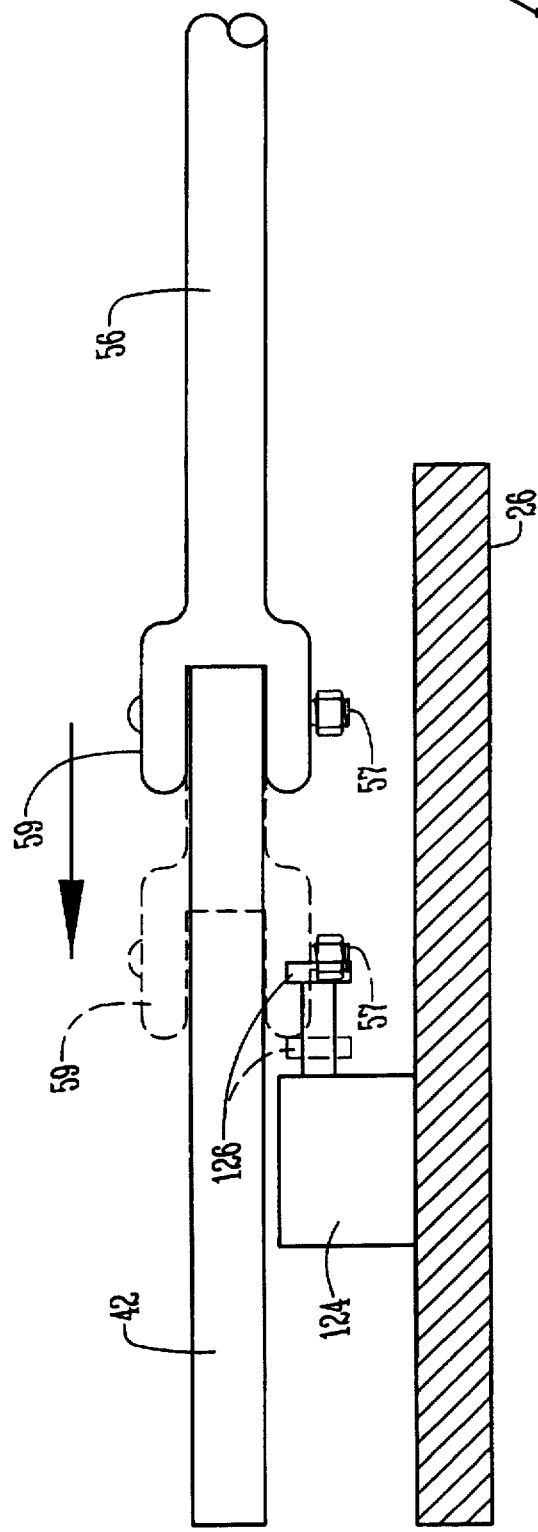

POSITIONING TABLE

BACKGROUND OF THE INVENTION

This invention relates to a positioning table, and specifically to a positioning table used for robotic automated systems. Reciprocating tables carrying work objects are often used in robotic systems. An operator places the work object on one side of the table in one work station while a robot processes another work object on the opposing side of the table. The table then rotates in a reciprocating motion to reverse the two parts. A protective barrier is mounted between the two sides of the table.

In order to accomplish the high speed station exchange, the reciprocating mechanism must be able to accelerate the table quickly and decelerate it quickly. If the table is traveling at full speed near the end of the exchange it will have difficulty stopping without banging into the end stop, resulting in damage to the system and the need for frequent repair or replacement of parts.

Other previous designs for reciprocating such tables have used a flow torque which is a rack and pinion driven by an air or hydraulic cylinder. The pinion in these designs, however, is small and does not produce much torque. Further, in using a hydraulic system, many factories are not set up with an oil supply so that the factory has the additional cost of the power unit to power the hydraulic system.

Another prior art design involves high speed tables which use an electric motor. The problem with this type of table, however, is that the motor must be oversized to accommodate the fast acceleration and deceleration required for the table.

There is therefore a need in the art for a reciprocating, high speed table which can quickly accelerate and decelerate without putting stress on the parts of the system and which is powerful yet not oversized.

It is therefore a primary objective of the present invention to provide a reciprocating high speed table which can accelerate and decelerate quickly without damaging the parts of the system.

It is another object of the present invention to provide a reciprocating high speed table which is powerful yet not oversized.

It is yet another object of the present invention to provide a reciprocating high speed table which is easy to use and economical to manufacture.

The method of accomplishing these and other objects will become apparent from the following description of the invention.

SUMMARY OF THE INVENTION

The foregoing objects may be achieved by a reciprocating table assembly comprising a frame, a table, and a bearing assembly rotatably mounting the table to the frame for rotation about a table axis. A cylinder assembly includes a cylinder, a piston, and a rod carried by the piston. The piston and the rod are movable within the cylinder between extended and retracted position. The cylinder is connected to the frame and the rod is pivotally connected to the table at a pivot point spaced from the table axis. The table is rotatable from a first position wherein the rod is in its extended position to an over center position wherein the rod is in its retracted position to a second position wherein the rod is again in its extended position. There are first, second, and over center sensors for sensing when the table is in its first position, its second position and its over center position respectively. A control means is connected to the cylinder assembly and to the first, second and over center sensors for moving the rod from an extended position to a retracted position so as to cause the table to move from its first position to its over center position. The control means then causes the rod to reverse from retracting and to begin extending to its extended position so as to move the table from its over center position to its second position.

Another feature of the invention includes an optional safety brake which provides emergency stopping to the system. The emergency brake is automatically activated when the power system is off. The control means which powers the reciprocating turn table also provides the power to inactivate or activate the safety brake. The brake is mounted between the bearing assembly and the turn table and applies pressure which prevents rotation of the reciprocating table assembly.

BRIEF DESCRIPTION OF THE DRAWINGS

FIG. 2 is a perspective view of the reciprocating table assembly taken along line 2—2 of FIG. 3.

FIG. 3 is a plan view of the reciprocating table assembly.

FIG. 4 is a sectional view of the reciprocating table assembly taken along line 4—4 of FIG. 3.

FIG. 5 is a sectional view of the reciprocating table assembly taken along line 5—5 of FIG. 3.

DETAILED DESCRIPTION OF THE PREFERRED EMBODIMENT

Figure 1:
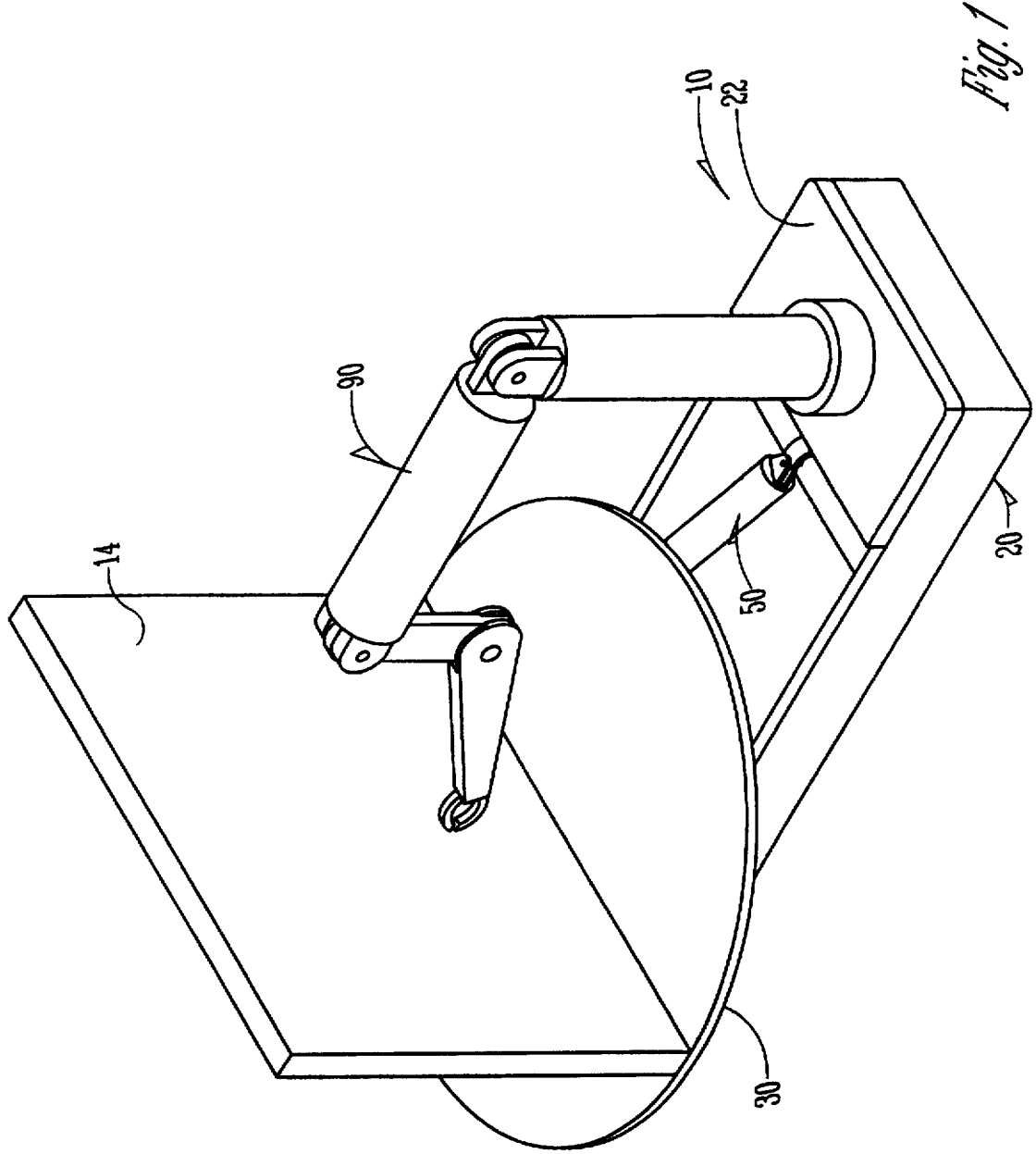
FIG. 1 is a perspective view of the reciprocating table assembly.

The reciprocating table assembly of the present invention is generally designated in the drawings by the reference numeral 10. The reciprocating table assembly 10 includes a frame 20 having a top platform 22 supporting a robotic arm 90 and a table platform 26 supporting a bearing assembly 40. FIG. 2 shows a schematic representation of bearing assembly 40. The bearing assembly 40 supports a disc 42 which in turn supports a pedestal 34. A table 30 is mounted on pedestal 34 and is rotatably connected to bearing assembly 40 through pedestal 34 and disc 42. A barrier 14 bisects table 30, separating the operator from the robotic arm 90.

Frame 20 also includes cross frame members 24 which support a cylinder assembly 50, and limit over center switch 60. Cylinder assembly 50 pivots from pivot point 51. Cylinder assembly 50 includes a cylinder 52, having a piston 54 (FIG. 6) and a rod 56 within. Rod 56 is movable by piston 54 within cylinder 52 between extended and retracted positions. Rod 56 terminates in a clevis 59 which is connected to disc 42 by a bolt 57 extending downwardly from clevis 59 at a connection point 58. Clevis 59 thus provides the rotatable connection between cylinder assembly 50 and table 30 such that the extension and retraction of rod 56 rotates disc 42 and table 30.

The reciprocating table assembly 10 has three sensors for detecting a first position, an over center position, and a second position of table 30. The first position of table 30 is where the table 30 is in a resting position wherein rod 56 of cylinder assembly 50 is extended and rests against stop block 122, as shown in shadow lines of FIG. 3. When table 30 rotates clockwise approximately a quarter of a turn around its axis, it reaches the over center position wherein clevis 59 of rod 56 is directly above an over center switch 60, as shown in FIG. 2. When table 30 rotates approximately another quarter turn clockwise, it reaches the second position wherein rod 56 is extended and rests against stop block 122.

The three sensors include limit over center switch 60, first limit switch 62, and second limit switch 64, respectively. Over center switch 60 is attached to cross frame member 24 and lies directly beneath clevis 59 when table 30 is in its over center position. First limit switch 62 and second limit switch 64 are attached to table platform 26 on opposite sides of platform 26 for sensing clevis 59 when table 30 is in its first and second positions respectively. When clevis 59 is retracted it causes table 30 to rotate in a clockwise direction until clevis 59 passes over center switch 60. Over center switch 60 then causes the piston 50 to begin extending so as to continue the rotation of the table 30 until it reaches its second position wherein clevis 59 is adjacent second limit switch 64.

The reciprocating table assembly 10 further includes a slow down switch 55 attached to the inside of piston 54 for sensing when rod 56 approaches its extended position, and for causing the venting of cylinder 50 during the slow down process as is more fully described below.

A pair of shock absorbers 124 are present on the table platform 26, one each next to first limit switch 62 and second limit switch 64. Shock absorbers 124 each have a plunger 126 which is engaged by clevis 59 and bolt 57 as table 30 approaches its first and second positions. The shock absorbers 124 decelerate the rotational force of table 30.

Also attached to table platform 26 are two stop blocks 122 which lie beneath disc 42. Each stop block 122 has a hammerhead 121 which serves as an impact point. Attached to the bottom of disc 42 is stop member 120 having hammerheads 123 and 125 on either side. When hammerhead 123 or 125 of stop member 120 impacts hammerheads 121 of stop block 122, the rotation of disc 42 is finally halted.

Reciprocating table assembly 10 includes a brake assembly, which is generally designated by the numeral 100. Brake assembly 100 provides a fail safe emergency stopping action to the reciprocating table assembly 10. The brake assembly 100 includes an airbag 102 having a shaft 104 extending upwardly therefrom. Two opposing arms 106 have brake pads 112 for frictionally engaging the upper and lower surfaces of disc 42. Bolt fulcrum 110 connects arms 106 and provides a pivot point for opposing arms 106. A spring 108 yieldably urges brake pads 112 into engagement with disc 42, thereby preventing its rotation and also the rotation of table 30. Airbag 102 can be expanded so as to overcome spring 108 and cause brake pads 112 to release disc 42 and permit it to rotate. Brake assembly 100 should be stabilized so that it is retained in position when the brake pads 112 are disengaged from the disc 42. This can be achieved by means which are well known in the art such as a bracket assembly clamped to the brake assembly 100 from table platform 26 or by the placement of a platform beneath the brake assembly 100.

Figure 6:
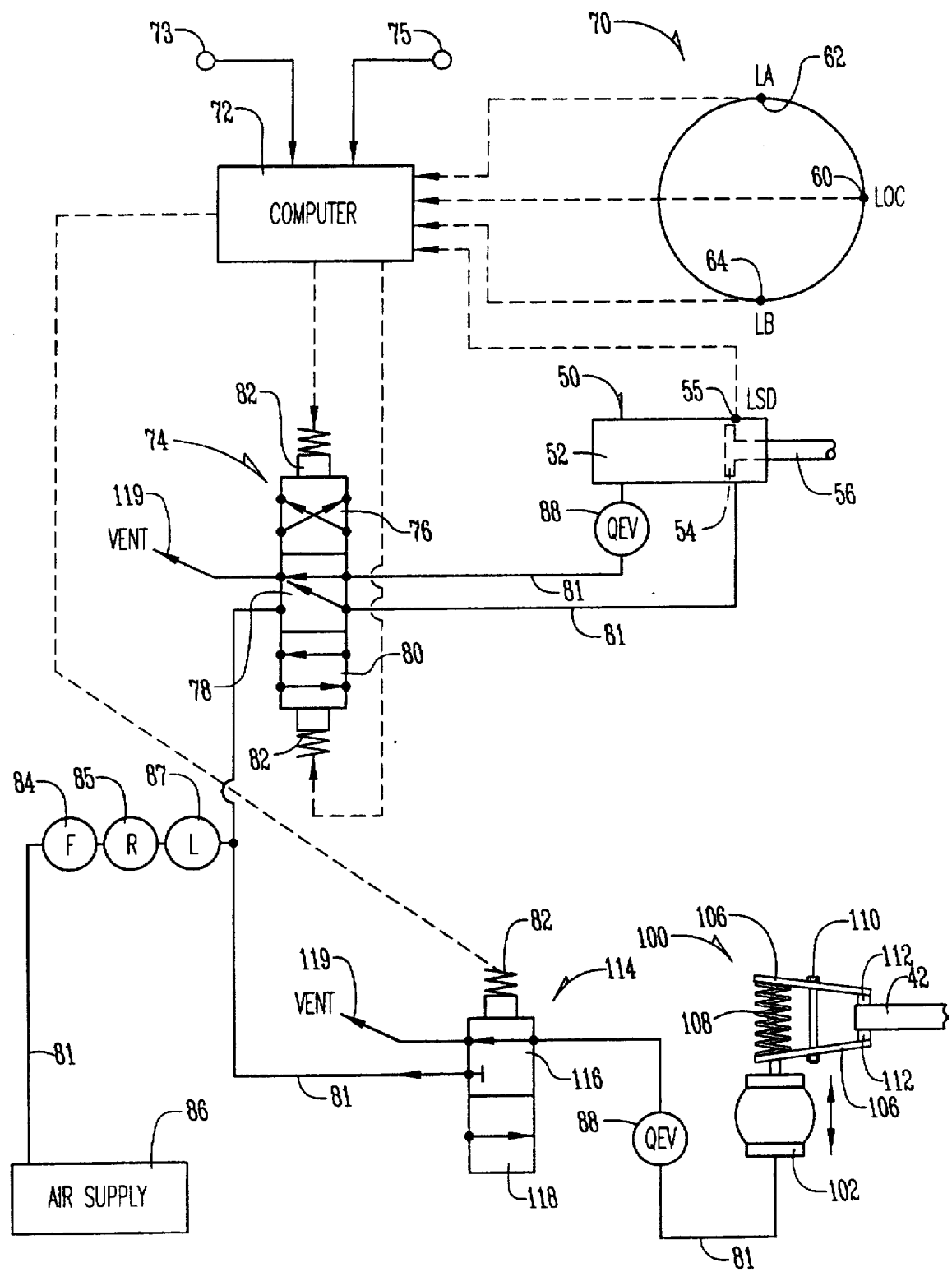
FIG. 6 is a schematic drawing of the control assembly supplying power to the reciprocating table assembly.

The reciprocating table assembly 10 is controlled by control assembly 70 as shown in FIG. 6. A computer 72 receives signals from the limit over center switch 60, first limit switch 62 and second limit switch 64, and activates a three-way valve 74. The three-way valve 74 includes solenoids 82 on opposite ends and is comprised of a first valve section 76, a second valve section 78, and a third valve section 80. The valve sections 76, 78 and 80 direct the flow of pressurized air from an air supply 86 through air lines 81 to cylinder 52 and also enable cylinder 52 to remove air through vent 119. Air flows through a filter 84, a regulator 85, and a lubricator 87 before reaching three-way valve 74. Further, a quick exhaust valve 88 lies in air line 81 between cylinder assembly 50 and vent 119.

Brake assembly 100 is also powered by control assembly 70. Control assembly 70 includes a two-way valve 114 having a first valve section 116 and a second valve section 118. The two-way valve 114 also includes a solenoid 82 which receives input from computer 72. The two-way valve 114 regulates the flow of air from air supply 86 through air line 81 to the airbag 102 and from the airbag 102 to another vent 119. A quick exhaust valve 88 lies in air line 81 between the brake assembly 100 and two-way valve 114.

Operation of the system is initiated by either an index button 73 or a cycle start button 75. Index button signals computer 72 to move the table 180° one time only. Cycle button causes the computer to initiate an automatic reciprocation of the table each time the robotic equipment completes its work on the work piece. The connection of the computer to the robotic equipment is not shown, but is well know.

During the operation of the reciprocating table assembly 10, rod 56 of cylinder 52 begins in an extended position shown in shadow lines in FIG. 3 so as to hold table 30 in its first position. Actuation of either button 73 or button 75 causes computer 72 to actuate solenoid 82 to move third valve section 80 to its operative position. This causes retraction of the clevis 59 and rotation of the table 30 clockwise towards the over center position. Once table 30 reaches the over center position, clevis 59 and bolt 57 activate over center switch 60. Over center switch 60 sends a signal to computer 72 which sends a signal to solenoid 82 to move first valve section 76 to its operative position. When first valve section 76 is in place, air from air supply 86 flows through air line 81 through filter 84, regulator 85 and lubricator 87. It next flows through first valve section 76, through quick exhaust valve 88 and into the area to the left of piston 54. The air behind piston 54 pushes piston 54 forward causing rod 56 to extend. Air which is in front of piston 54 then flows through air line 81, through the first valve section 76 and out of the control assembly 70 through vent 119.

The inertia of table 30 causes it to continue rotating in a clockwise direction beyond its over center position. When rod 56 begins to extend, it rotates table 30 clockwise towards the second position. As table 30 approaches the second position, piston 54 activates slowdown switch 55 which sends a signal to computer 72 to move second valve section 78 to its operative position. This vents both sides of cylinder 50 to stop the driving force of cylinder 50. Clevis 59 then engages shock absorber 124, which because cylinder 50 is vented, has only to absorb the inertia of table 30. After a short period of time (approximately ½ second) the computer reactivates first valve section 76 to extend cylinder 50 and hold hammerhead 125 of stop 120 against hammerhead 121 of stop 122. If index button 73 was used initially, table 30 will remain in its second position until button 73 is pushed again. If cycle start button was used initially, table 30 will remain in its second position until computer 72 senses from the robotic equipment that the robotic function has been completed on the work piece. Then computer 72 sends a signal to solenoid 82 to activate third valve section 80. When third valve section 80 is in place, air from air supply 86 flows through air line 81 and into the area in front of piston 54 which forces rod 56 to begin retracting. Air which is behind piston 54 then flows outwardly through air line 81, through third valve section 80, and out of the control assembly 70 through vent 119. The rotational inertia of table 30 carries it past over center switch 60. As table 30 approaches its first position, slow down switch 55 signals computer 72 to move second valve section 78 to its operative position to vent cylinder 50. Table 30 then reaches shock absorber 1224 and its plunger 126. Clevis 59 and bolt 57 engage plunger 126 to decelerate the rotation of table 30. Hammerhead 125 of stop member 120 next impacts hammerhead 121 of stop block 122 which halts the rotation of table 30. Computer 72 then causes first valve section 76 to be operable to extend piston 54 and hold hammerhead 125 of stop member 120 against hammerhead 121 of stop block 122. The process then repeats itself.

Control assembly 70 operates brake assembly 100 as follows. When the power is on, computer 72 sends a signal to solenoid 82 to activate second valve section 118. Air from air supply 86 flows through the filter 84, regulator 85, and lubricator 87 through air line 81 and into second valve section 118. The air then travels through quick exhaust valve 88 and into air bag 102. Airbag 102 inflates and compresses spring 106. The compression of spring 106 causes opposing arms 106 to tilt outwardly to release brake pads 122 from disc 42. Disc 42 is then free to rotate.

When the electricity goes off or the air source is removed, computer 72 shuts down power to solenoid 82 and a spring moves valve 114 to its original position shown in FIG. 6 wherein air is vented to vent 119. Thus, air bag 102 deflates and causes spring 108 to expand which tilts opposing arms 106 inwardly to engage disc 42. Disc 42 is thereby prevented from rotating.

The control assembly 70 produces force sufficient to quickly rotate the table 30 between work stations for more efficient operation of the automated process in contrast to reciprocating mechanisms which use a rack and pinion system. Sensors 60, 62, and 64 allow the reciprocating table assembly to quickly sense the position of the table 30 so that cylinder assembly 50 can respond and either extend or retract the rod 56 at the appropriate times. Further, the pneumatic assembly set forth in the preferred embodiment takes up less space than electric motors used in other high speed tables.

Shock absorbers 124 provide deceleration of the reciprocating table assembly 10 so that by the time the disc 42 passes either first limit switch 62 or second limit switch 64 and reaches a spring-loaded stopper 124, its rotational force has already been significantly reduced and there is therefore less wear and tear placed on the machinery than with conventional reciprocating mechanisms.

Also, brake assembly 100 is an improvement over conventional reciprocating mechanisms in that it provides a safety mechanism for preventing the rotation of the table 30 upon the failure of electricity or air pressure.

The invention has been shown and described above in connection with the preferred embodiment, and it is understood that many modifications, substitutions, and additions may be made which are within the intended broad scope of the invention. From the foregoing, it can be seen that the present invention accomplishes at least all of the stated objectives.

What is claimed is:

1. A reciprocating table assembly comprising:

a frame;

a table;

a bearing assembly rotatably mounting said table to said frame for rotation about a table axis;

a cylinder assembly comprising a cylinder, a piston, and a rod carried by said piston, said piston and rod being movable within said cylinder between extended and retracted positions;

said cylinder being connected to said frame;

said rod being pivotally connected to said table at a pivot point spaced from said table axis;

said table being rotatable from a first position wherein said rod is in said extended position to an over center position wherein said rod is in said retracted position to a second position wherein said rod is again in said extended position;

first, second, and over center sensors for sensing when said table is in said first position, said second position, and said over center position; and control means connected to said cylinder assembly and to said first, second and over center sensors for moving said rod from said extended position to said retracted position to move said table from said first position to said over center positions, and for moving said rod from said retracted position to said extended position to move said table from said over center position to said second position.

2. A reciprocating table assembly according to claim 1 which further includes a disc mounted on said bearing assembly, said disc being pivotally connected to the rod of said cylinder assembly.

3. A reciprocating table assembly according to claim 2 wherein the disc includes a circular flange which is pivotally connected to the rod by a clevis having upper and lower prongs and extending from the rod.

4. A reciprocating table assembly according to claim 3 wherein a bolt extends downwardly from the lower prong of the clevis.

5. A reciprocating table assembly according to claim 1 wherein the frame further includes first and second platforms wherein the first platform supports the bearing assembly and the second platform supports a robotic arm.

6. A reciprocating table assembly according to claim 1 wherein the cylinder assembly is pivotally connected to the frame by a cross frame member.

7. A reciprocating table assembly according to claim 1 wherein the over center sensor signals the rod to begin extending.

8. A reciprocating table assembly according to claim 2 which further includes first and second spring-loaded stoppers connected to the disc.

9. A reciprocating table assembly according to claim 8 which further includes first and second stop blocks which are stationary, and further providing that the table assembly include first and second stop members underneath the disc in rotational alignment with the first and second stop blocks.

10. A reciprocating table assembly according to claim 1 further including a brake assembly comprising:

a pair of brake pads movable between an engaged position holding said table against rotational movement and a disengaged position permitting said table to rotate;

a spring yieldably urging said brake pads to said engaged position; and control means for moving said brake pads to said disengaged position.

11. A reciprocating table assembly according to claim 1 wherein the control means includes pneumatic power means.

* * * * *